United States Patent [19]

Feger et al.

[11] Patent Number: 4,809,143

[45] Date of Patent: Feb. 28, 1989

[54] VEHICLE LIGHT ASSEMBLY INCLUDING SEVERAL INCANDESCENT LAMPS

[75] Inventors: Rolf Feger, Bietigheim-Bissingen; Gunther Holzmacher, Asperg, both of Fed. Rep. of Germany

[73] Assignee: ITT Industries, Inc., New York, N.Y.

[21] Appl. No.: 195,450

[22] Filed: May 17, 1988

Related U.S. Application Data

[63] Continuation of Ser. No. 423,680, Sep. 27, 1982, abandoned.

[30] Foreign Application Priority Data

Dec. 24, 1981 [DE] Fed. Rep. of Germany ....... 3151500

[51] Int. Cl.[4] ........................ F21V 21/00; B60Q 1/00; H01R 11/22

[52] U.S. Cl. .................................... 362/249; 439/839; 362/61; 362/80

[58] Field of Search ........................... 362/61, 80, 249; 339/170, 182 L, 189 L, 10, 127 C, 127 R, 259 R, 255 R; 439/839

[56] References Cited

U.S. PATENT DOCUMENTS 3,662,324 5/1972 Schumacher ............... 339/259 R X
4,423,475 12/1983 Bärtl ................................ 362/83 X

FOREIGN PATENT DOCUMENTS 2602237 7/1977 Fed. Rep. of Germany ...... 362/249
2945733 5/1981 Fed. Rep. of Germany .

*Primary Examiner*—John S. Maples
*Attorney, Agent, or Firm*—James B. Raden

[57] ABSTRACT

A vehicle light including several incandescent lamps which are inserted in sockets of plastic lamp holder by means of the lamp base or cap which forms the connection for the incandescent lamp. A lug is punched from a thin sheet metal billet in one piece with a lead for the respective incandescent lamp and is bent towards the bottom of the socket and squeezed between the base or cap and the socket by a spring.

9 Claims, 1 Drawing Sheet

VEHICLE LIGHT ASSEMBLY INCLUDING SEVERAL INCANDESCENT LAMPS

This is a continuation of application Ser. No. 423,680, filed Sept. 27, 1982, now abandoned.

BACKGROUND OF THE INVENTION

This invention relates to a vehicle light assembly including the features of the invention.

At the present time it is common practice to accomodate the incandescent lamps necessary for the various signalling functions such as stop light, brake light, turn-signal light and back-up light in a multi-purpose light assembly including several chambers. The connection of the incandescent lamps is to be effected through a single multiple plug. Therefore conductive connections have to be provided within the light assemlby between the incandescent lamps and the various connection points in the multiple plug. In general metal conductors from sheet metal conducting from the multiple plug to the incandescent lamps are used for this purpose.

Such vehicle light assemblies are for example known from the German specification OS No. 2,945,733. In such a vehicle light assembly, each lead to be connected to the cap of an incandescent lamp includes an integrally connected lug which directly rests against the bottom of the incandescent lamp cap. Due to the narrow contact surface available on the bottom and due to the available centre contact or centre contacts a reliable contact is not ensured in all cases and short circuits cannot always be avoided. This is why in another version the lug is bent in the longitudinal direction of the lamp socket, so that it rests against the cylindric outer surface of the incandescent lamp cap. The lug enters the socket laterally through an aperture and extends towards the open end of the socket, thus opposite to the mounting direction of the incandescent lamp.

It is an object of the present invention to develop a vehicle light assembly in such a way that the vehicle light assembly can be produced in a simpler manner and more economically and that a reliable contact making between the incandescent lamp cap and a lug of a lead bent into the socket is ensured.

SUMMARY OF THE INVENTION

This problem is solved according to the invention in a vehicle light assembly including the features of the invention in that the lug is bent towards the bottom of the socket and is squeezed between the cap and the socket.

Thus in a vehicle light assembly according to the invention the lug extends into a direction which is opposite to that known from the prior art. The lug consisting of a thin sheet metal can be bent into this direction, when an incandescent lamp is inserted for the first time. A separate working phase for bending the lug is saved. Due to the fact that the punched sheet metal billets remain in a plane condition until finally they can be piled up more easily. Thus the production of the light assembly becomes simpler and more economical. More over the lug squeezed between the incandesecent lamp cap and the socket ensures a reliable contact-making. For the sheet metal billet a non-expensive material without spring qualities can be used.

In order to better compensate tolerances it is advantageous not to use the entire socket as the element producing the entire contact pressure, but according to the invention to squeeze the lug between the cap and a spring element is part of the socket and is supported thereon. The use of a leaf spring proved to be advantageous due to the fact that it can easily be accomodated in the socket.

The construction and mounting is especially simple, when according to the invention the leaf spring consists of plastic and is formed onto the socket in one piece. Advantageous embodiments which in particular relate to how a simple injection-moulding die is obtained by an appropriate design and arrangement of the leaf spring from plastics material are described in the accompanying drawings and in the following detailed description.

Figure 1:
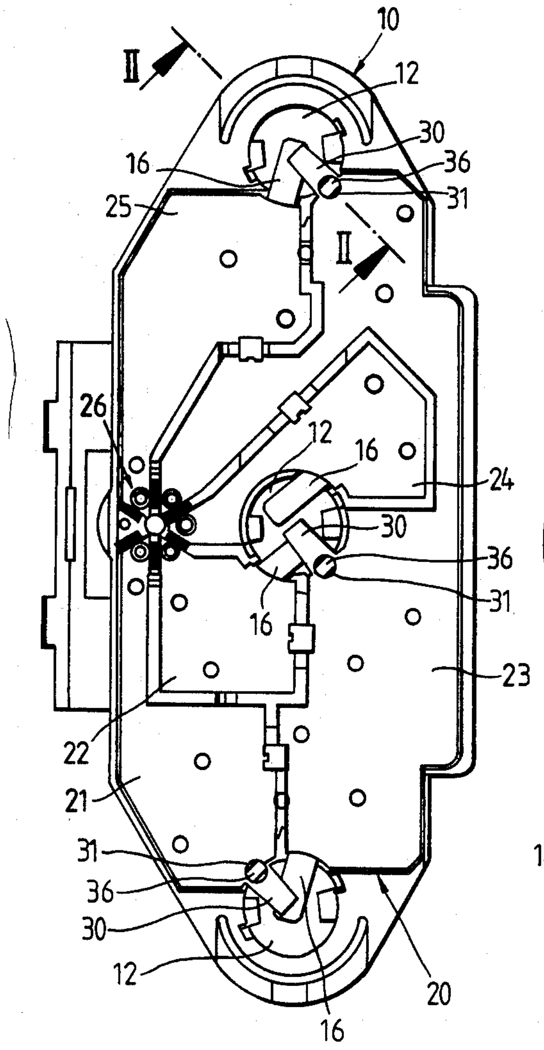
FIG. 1 is a plan view of the invention.

Spring 16 rests against a centre contact 17 of this incandescent lamp. A metal sheet billet 20 is fastened on the lamp holder 10, from which metal sheet billet five metal conductors 21, 22, 23, 24 and 25 are punched, which are electrically insulated from one another and which begin at a central plug 26. The metal conductor 23 may be connected to ground and leads to each of the three sockets 12. The metal conductor 21 leads to the bottom socket 12, the metal conductor 25 to the uppermost socket 12 and the metal conductors 22 and 24 to the socket in the middle. The contact springs 16 serves to effect the electric connection between the various metal conductors and the centre contacts of the incandescent lamps 11. The contact springs are step-shaped including two portions extending approximately transverse to the longitudinal direction of the sockets 12 and one portion extending in the longitudianl direction of the sockets. With one of the first-mentioned portions the contact springs 16 are positioned below the corresponding metal conductors. The centre portion is put in the wall of the sockets 12, while the last-mentioned portion projects from the wall into the interior of the socket and acts upon a centre contact 17 of an incandescent lamp 11. Thus one terminal of each incandescent lamp 11, namely a centre contact 17, can be connected to the electric network of the vehicle via the multiple plug 26.

The contact between the other pole of each candescent lamp 11, namely the cap 15, and a further metal conductor is effected via metal sheet lugs 30 which are integrally punched with the attributed metal conductor 21 or 23 from the sheet metal billet 20. Before the incandescent lamps 11 are inserted the sheet metal lugs 30 are positioned in the plane of the sheet metal billet 20, as can clearly be seen from FIG. 2 in particular. The sheet metal billet is arranged at approximately the level of the open end of the sockets 12. At the connection point between a lug 30 and the attributed metal conductor a circular disk-shaped aperture is punched out, by which the cross-section of the material is decreased and a desired bending point is created. As FIG. 2 also clearly shows the desired bending point is positioned at the upper rim of the socket 12 at a spacing in front of the last layer 32 of the sheet metal billet 20.

Figure 2:
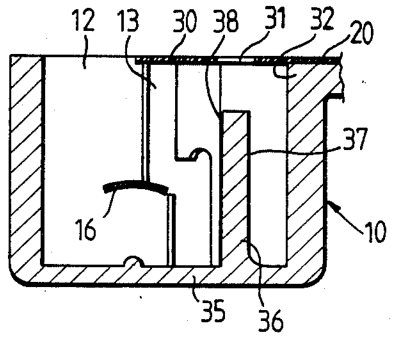
FIG. 2 is a cross-sectional view of the invention taken along line II—II of FIG. 1.

In unbent condition the lugs 30 extend from the desired bending point 31 in radial direction into the sockets 12. FIG. 2 also clearly shows that the length of the lugs 30 from the desired bending point 31 to their front end is smaller than the spacing between the desired bending point 31 and the relaxed contact springs 16.

Below the desired bending point 31 and at the same distance from a centre line as the remaining outer wall of a socket 12 a leaf spring 36 is formed in one piece onto the bottom 35 of each socket 12, which leaf spring extends towards the open end of the socket, but ends a short distance below it. The bending plane of the leaf spring, thus the plane in which the leaf spring can spring, and the longitduinal direction of the socket are also parallel to each other. As can be seen from FIG. 2 the lateral surfaces 37 and 38 of the leaf spring 36 in the untensioned condition of the leaf spring extend in parallel to the longitudinal direction of the socket 12. The two other lateral surfaces of the leaf spring 36 are also formed in such a way that the leaf spring can be entirely removed from the mould through the open end of the socket 12. The surface 38 of the spring 36 extending into the interior of the socket 12 is curved in accordance with a cap 15 of an incandescent lamp 11. The width of the spring 36 in the azimuthal direction of the socket 12 approximately corresponds to the width of the lug 30.

In order not to have unnecessary openings in the lamp holder 10 the leaf spring 36 is accomodated in a closed recess 39 of the socket 12.

Figure 3:
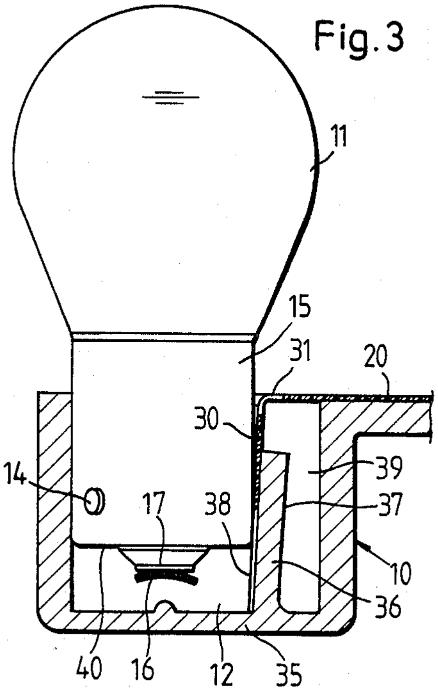
FIG. 3 is a cross-sectional view of the invention taken along line II—II of FIG. 1 showing a lamp inserted in a socket.

The metal sheet lugs 30 are bent into the sockets 12 only when the incandescent lamps 11 are mounted and then the lugs are squeezed between the cap of an incandescent lamp 11 and the leaf spring 36. This is to be seen from FIG. 3. The leaf spring 36 acts upon the lug 30 at a spacing to the desired bending point 31 and above the bottom 40 of the cap 15. When the incandescent lamp 11 is inserted it is slightly bent into the recess 39. by the shape and arrangement of the leaf spring 36 it is ensured that this spring does not rest against the incandescent lamp cap, but against the sheet metal lug 30. The sheet metal lug 30 ends above the bottom 40 of the cap 15.

This invention creates a vehicle light assembly which can be simply and ecnomically produced and which ensures a reliable contact making between the terminals of the incandescent lamps and the leads.

What is claimed is:

1. In combination with a vehicle light assembly for incandescent lamps having a bottom center contact and a cap contact and wherein the assembly has a non-conductive lamp holder defining multiple cavities, each cavity having a bottom and a side wall, and a first contact spring in each cavity for electrical connection with the bottom center contact of each lamp, the improvement which comprises; a metal sheet conductor fastened to the holder and positioned in a plane perpendicular to a longitudinal axis of the lamps substantially level with the open end of the cavities; a coplanar bendable portion of the sheet conductor associated with each cavity capable of extending into the cavity along the cap contact when bent by the insertion of the lamp into the holder; and a second contact spring integral with the lamp holder associated with each cavity extending up from the bottom of the cavity and located within the cavity at the same distance from the center line of the cavity as the outer surface of the lamp cap so as to form a socket for each lamp, whereby the second contact spring urges the bendable portion of the sheet conductor against the cap contact of the lamp and maintains an electrical connection between them when the lamp is inserted into the socket.

2. A vehicle light assembly for at least one incandescent lamp, each lamp having a first electrical contact at its bottom and a cylindrical second electrical contact extending circumferentially above the first electrical contact, comprising: a lamp holder formed of resilient, non-conductive material and defining cavities, each cavity having a bottom and a side wall to receive an incandescent lamp, the side wall of said cavities extending longitudinally with respect to said lamps and defining a circumference greater than the diameter of the second electrical contact of the lamps; a conductive sheet billet fastened to said holder and positioned substantially level with the open end of the cavities in a plane perpendicular to a lontiduinal axis of the lamps, a bendable portion of said billet capable of extending into the cavity upon insertion of a lamp into said cavity such that when the lamp is inserted therein said bendable portion extends into said cavity so as to contact the second contact of the lamp; a first electrical contact spring for each cavity conductively connecting the billet and the first electrical contact at the bottom of each the lamps; and a second nonconductive electrical contact spring integral with the holder and extending up from the bottom of each cavity, the second spring located within the cavity at the same distance from the center line of the cavity as the outer surface of the cylindrical second electrical contact of the lamp so as to form a socket afor the lamp, whereby the second spring urges the bendable portion of the billet against the second contact of the lamp and maintains an electrical connection between them when the lamp is inserted into the socket.

3. The vehicle light assembly of claim 2 whereby the second spring is curved to correspond to the curvature of the second contact of the lamp.

4. The vehicle light assembly of claim 2 whereby the second spring is perpendicular to the bottom of the cavity when the second spring is not tensioned.

5. The vehicle light assembly of claim 2 whereby the second spring contacts the bendable portion of the billet at a distance from the bending point of the billet.

6. The vehicle light assembly of claim 2 whereby the second spring contacts the bendable portion of the billet above the bottom of the second electrical lamp contact.

7. The vehicle light assembly of claim 2 whereby the second spring is a leaf spring.

8. The vehicle light assembly of claim 2 wherein the bending plane of the second spring extends in the longitudinal direction of the cavity.

9. The vehicle light assembly of claim 2 whereby the lamp holder and the second spring are plastic.

* * * * *